(12) United States Patent
Ikeda et al.

(10) Patent No.: US 7,367,187 B2
(45) Date of Patent: May 6, 2008

(54) ELECTRICALLY ACTUATED BRAKE BOOSTER

(75) Inventors: Junichi Ikeda, Tokyo (JP); Yukio Ohtani, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 122 days.

(21) Appl. No.: 11/475,057

(22) Filed: Jun. 27, 2006

(65) Prior Publication Data
US 2007/0199436 A1  Aug. 30, 2007

(30) Foreign Application Priority Data
Jun. 30, 2005  (JP) .............................. 2005-192490

(51) Int. Cl.
*B60T 13/74* (2006.01)
*F16D 65/14* (2006.01)
(52) U.S. Cl. ....................................... 60/545
(58) Field of Classification Search .................. 60/538, 60/545
See application file for complete search history.

(56) References Cited
U.S. PATENT DOCUMENTS

| | | | |
|---|---|---|---|
| 5,094,079 A * | 3/1992 | Leigh-Monstevens et al. ............................ | 60/545 |
| 6,574,959 B2 * | 6/2003 | Fulks et al. .................... | 60/545 |
| 6,634,724 B2 * | 10/2003 | Kobayashi et al. ............ | 60/545 |
| 6,758,041 B2 * | 7/2004 | Bishop et al. ................. | 60/545 |
| 6,848,256 B2 * | 2/2005 | Oshimo ......................... | 60/545 |

FOREIGN PATENT DOCUMENTS

| | | |
|---|---|---|
| JP | 60-92151 | 5/1985 |
| JP | 10-138909 | 5/1998 |
| JP | 10-138910 | 5/1998 |

\* cited by examiner

*Primary Examiner*—Thomas E. Lazo
(74) *Attorney, Agent, or Firm*—Wenderoth, Lind & Ponack, L.L.P.

(57) ABSTRACT

An electrically actuated brake booster capable of obtaining a desired boost ratio for a given input pressure when an electric actuator is activated as a boost source, so as to ensure a desired operability of a brake pedal. The electrically actuated brake booster comprises: an input piston 22 to which an input thrust is applied through an input rod 9 that moves in coordination with operation of a brake pedal 8; and a booster piston 21 to which a booster thrust is applied by an electric actuator 40 that uses an electric motor 41 as a drive source, such that the input piston 22 and the booster piston 21 are disposed to be movable relative to each other but are normally maintained in a neutral position of relative displacement by means of springs 34. While an amount of relative displacement between the pistons 21 and 22 is determined by the potentiometer 45, the electric motor 41 is controlled to adjust the amount of relative displacement to a predetermined value. At the same time, a reaction force acting on the input piston 22 resulting from a hydraulic brake pressure is offset by urging forces of the springs 34 to thereby obtain a desired level of boost ratio.

17 Claims, 8 Drawing Sheets

(A)

(B)

(C)

ELECTRICALLY ACTUATED BRAKE BOOSTER

BACKGROUND OF THE INVENTION

1. Technical Field

The present invention relates to a booster for use in a brake mechanism of an automobile, in particular, an electric booster that utilizes an electric actuator as a boost source.

2. Prior Art

Conventionally, vacuum brake boosters are commonly used in automobile brake mechanisms. Such vacuum brake boosters utilize a negative pressure in an engine intake pipe to boost an input to generate an increased output. In recent years, however, with the development of engines having an improved fuel efficiency, cleaner exhaust gas, and so on, intake pipes have tended to be designed so as to have a relatively low negative pressure. In order to ensure a desired boosting performance or responsiveness of such a vacuum brake booster, a measure must be taken, for example, to increase a size of the vacuum brake booster, to increase a negative pressure by using an ejector, or to provide the vacuum brake booster with an engine-driven vacuum pump. Use of such measures, however, makes it more difficult to mount the vacuum brake booster in a vehicle, and increases costs.

For these reasons, attention has been directed to electrically actuated brake boosters that utilize an electric actuator as a boost source. Such electrically actuated brake boosters are disclosed, for example, in patent references 1 and 2 (Japanese Patent Public Disclosures No. HEI 10-138909 and HEI 10-138910). These electrically actuated brake boosters comprise: a main piston (a shaft member) adapted to move forward and backward in response to operation of a brake pedal; a booster piston (a tubular member) that is fitted around the main piston and is movable relative to the main piston; and an electric actuator for moving the booster piston forward and backward. The main piston and the booster piston function as pistons of a master cylinder, the front ends of the main piston and the booster piston defining a pressure chamber of the master cylinder, such that a hydraulic brake pressure is generated in the master cylinder by an input thrust transmitted to the main piston from the brake pedal and a booster thrust transmitted to the booster piston from the electric actuator.

Therefore, in the electrically actuated boosters of the above-mentioned references 1 and 2, a part of a reaction force resulting from a hydraulic brake pressure generated in the pressure chamber of the master cylinder acts on the main piston (shaft member), while another part of the reaction force acts on the booster piston (tubular member). Thus, when an attempt is made to increase a thrust of the booster piston and thereby increase a hydraulic brake pressure in the master cylinder, for activating a brake assist, the hydraulic brake pressure acts as a reaction force on the main piston so as to move back the main piston in coordination with the brake pedal.

In other words, to obtain a desired braking force, an input thrust (a pedal-stepping force) needs to be increased to prevent the main piston from moving backward. As a result, a boost ratio for the input thrust fails to increase.

The present invention was made in view of the above-mentioned problem associated with the conventional brake boosters. An object of the present invention is to provide an electrically actuated booster that is capable of obtaining a desired boost ratio for a given input thrust when an electric actuator is activated as a boost source, to thereby improve brake pedal operability.

SUMMARY OF THE INVENTION

To overcome the above-described problem, the electrically actuated brake booster of the present invention includes: a first member adapted to move forward and backward in accordance with operation of a brake pedal; a second member disposed so as to be capable of moving relative to the first member; and an electric actuator for moving the second member forward and backward, wherein a hydraulic brake pressure is generated in a master cylinder by an input thrust applied to the first member by the brake pedal and a booster thrust applied to the second member by the electric actuator, such that a part of a reaction force resulting from the hydraulic brake pressure is transmitted to the first member, while another part of the reaction force is transmitted to the second member, the electrically actuated brake booster comprising:

urging means disposed between the first member and the second member, wherein, when the first member and the second member are displaced relative to each other in at least one direction, an urging force of the urging means in a direction in which the second member is displaced relative to the first member becomes larger than that in a state prior to relative displacement between the first and the second members.

As a preferred embodiment of the present invention, an electrically actuated brake booster includes: a shaft member adapted to move forward and backward in accordance with operation of a brake pedal; a tubular member disposed outside the shaft member so as to be capable of moving relative to the shaft member; and an electric actuator for moving the tubular member forward and backward, the shaft member and the tubular member serving as pistons of the master cylinder, front tip portions of the shaft member and the tubular member being disposed to face a pressure chamber of a master cylinder, such that a hydraulic brake pressure is generated in the master cylinder by an input thrust applied to the shaft member by the brake pedal and a booster thrust applied to the tubular member by the electric actuator, the electrically actuated brake booster comprising:

urging means for maintaining the shaft member and the tubular member in a neutral position of relative displacement, when brakes are not in operation; and displacement-detecting means for detecting an amount of relative displacement between the shaft member and the tubular member, wherein the electric actuator is controlled on the basis of a detection signal output from the displacement-detecting means so as to adjust the amount of relative displacement to a predetermined value.

Regarding the above-described structure of the electrically actuated brake booster, when the second member or the tubular member is relatively displaced by the electric actuator as a booster source in a direction, for example, in which the hydraulic brake pressure increases, an urging force of the urging means acting on the first member or the shaft member that moves in coordination with operation of the brake pedal increases in the same direction. This urging force accordingly offsets the reaction force, resulting from the hydraulic brake pressure, on the first member or the shaft member. As a result, a desired boost ratio for a given input thrust can be obtained.

The electrically actuated brake booster of the present invention includes an urging means that is disposed between the first member or the shaft member and the second member or the tubular member. Therefore, by adjusting the amount of relative displacement between the first member or the shaft member and the second member or the tubular member to an appropriate value, a boost ratio can be increased or decreased. As a result, when the electric actuator is operated as a boost source, a desired boost ratio for the input thrust can be obtained to ensure a desired operability of a brake pedal.

BRIEF DESCRIPTION OF THE DRAWINGS

FIG. 9 (A) is a plan view of a substrate of the potentiometer. FIG. 9 (B) is a longitudinal cross-sectional view of an entire configuration of the potentiometer. FIG. 9 (C) is a transverse cross-sectional view of the entire configuration of the potentiometer.

DETAILED DESCRIPTION OF THE INVENTION

Below, the best modes for carrying out the present invention will be described with reference to the accompanying drawings.

Figure 1:
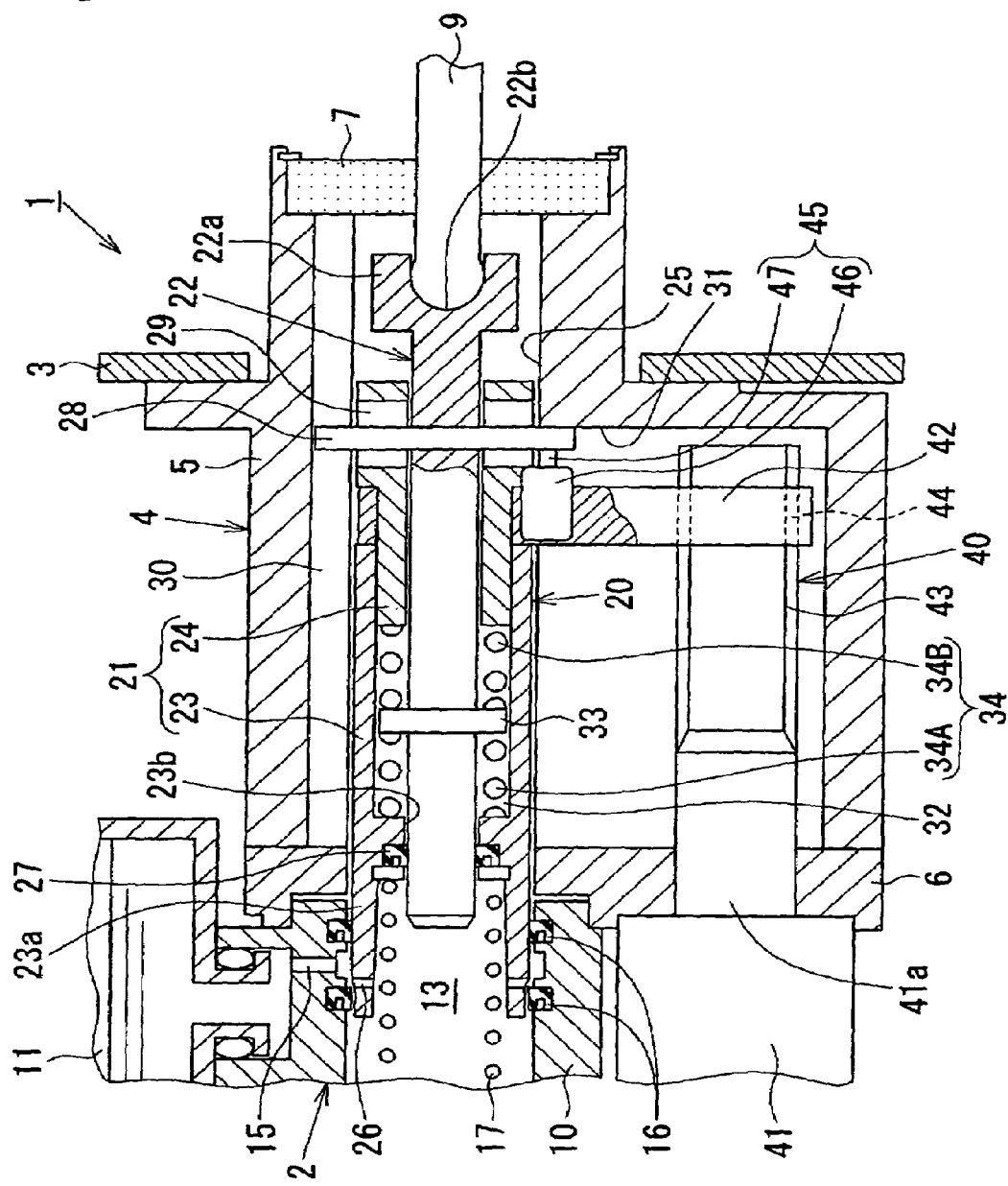
FIG. 1 is a cross-sectional view of an essential feature of an electrically actuated brake booster according to a first embodiment of the present invention.
Figure 2:
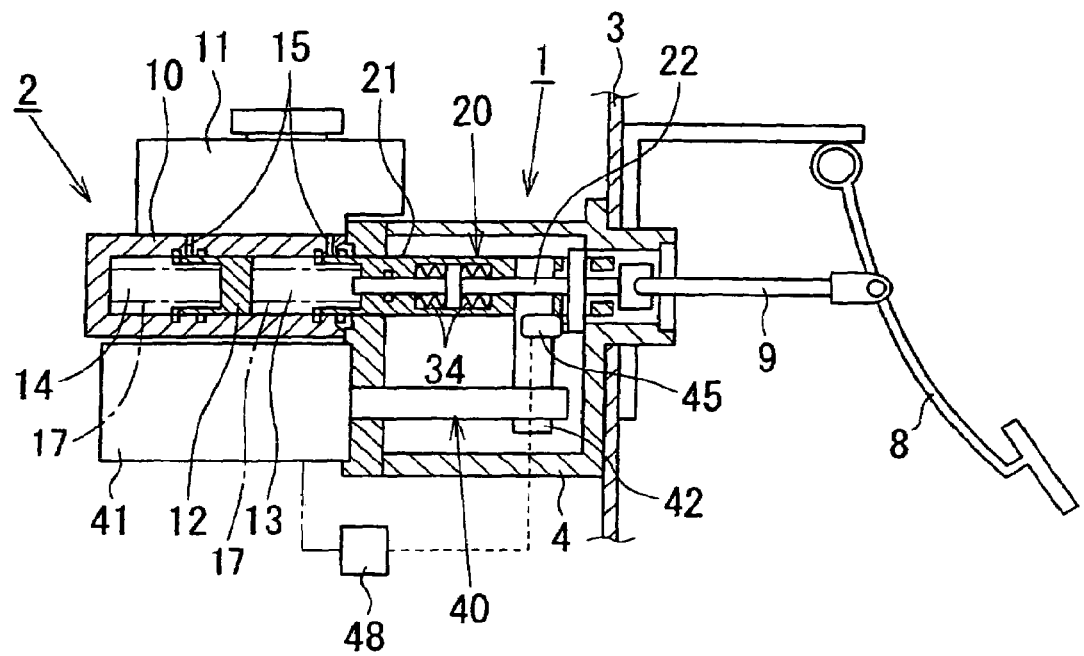
FIG. 2 is a schematic view of a structure of a vehicle brake mechanism including the electrically actuated brake booster of the first embodiment.

FIGS. 1 and 2 show an electrically actuated brake booster according to the first embodiment of the present invention. The electrically actuated brake booster 1 comprises: a piston assembly 20 (described later) used as a primary piston of a tandem master cylinder 2 and; an electric actuator 40 (also described later) for applying a thrust (a booster thrust) to a booster piston 21 (a tubular member or a second member) which is a constituent component of the piston assembly 20, the piston assembly 20 and the electric actuator 40 being disposed inside and outside a housing 4 (a support member) that is secured to a wall 3 of a vehicle compartment. The housing 4, as best shown in FIG. 1, comprises: a housing body 5, a rear portion of which is inserted into the vehicle compartment; and a covering plate 6 for covering a front opening of the housing body 5. The tandem master cylinder 2 and an electric motor 41, which is a constituent component of the electric actuator 40, are provided on a front surface of the covering plate 6. An opening of the housing body 5 facing the vehicle compartment is provided with a silencer 7 for preventing noise of the electrically actuated brake booster 1 entering the vehicle compartment, and also for preventing dust in the vehicle compartment from entering the electrically actuated brake booster 1, the silencer 7 being formed by stacking a felt material and an elastic material.

As schematically shown in FIG. 2, the tandem master cylinder 2 comprises a cylinder body 10 with a closed end and a reservoir 11. On a far side from an open end of the cylinder body 10 is disposed a secondary piston 12 that functions in tandem with the piston assembly 20 serving as a primary piston, the secondary piston 12 being slidable in the cylinder body 10. In the cylinder body 10, two pressure chambers 13 and 14 are defined by the piston assembly 20 and the secondary piston 12. Therefore, as the pistons 20 and 12 move forward, brake fluid confined in the pressure chambers 13 and 14 is transmitted to corresponding wheel cylinders of the brake system to apply a pressure thereto.

The cylinder body 10 has relief ports 15 formed in a wall thereof, the relief ports 15 communicating between the pressure chambers 13 and 14 and the reservoir 11. Further, each of the relief ports 15 is located between a pair of sealing members 16 that are disposed on an interior surface of the cylinder body 10. When the pistons 20 and 12 are moved forward, the pressure chambers 13 and 14 are closed to the relief ports 15 by the pistons 20 and 12, such that the outer circumferential surfaces of the pistons 20 and 12 make sliding contact with corresponding pairs of sealing members 16. It should be noted that the pressure chambers 13 and 14 each have a return spring 17 for urging backward each of the piston assembly 20 serving as a primary piston, and the secondary piston 12.

The piston assembly 20, which is a constituent component of the electrically actuated brake booster 1, has a structure in which an input piston 22 (a shaft member or a first member) is disposed in an interior of the booster piston 21, such that the input piston 22 is capable of moving relative to the booster piston 21. The input piston 22 has an enlarged diameter portion 22a formed on a rear end thereof, the enlarged diameter portion 22a being connected to an input rod 9 which extends from a brake pedal 8 (see FIG. 2), such that the input piston 22 is moved forward and backward by operation of the brake pedal 8 (pedal operation). In this embodiment, a front end of the input rod 9 is fitted into a spherical recess portion 22b formed in the enlarged diameter portion 22a, thereby allowing pivotal movement of an input rod 9.

In this embodiment, the booster piston 21, which is a constituent component of the piston assembly 20, comprises: a piston body 23 having a cup-shaped portion 23a formed in a front end portion thereof, the cup-shaped portion 23a being inserted into the pressure chamber 13 (a primary chamber) of the master cylinder 2; and a stopper member 24 that is press-fitted into a rear end portion of the piston body 23 via an operation lever 42, which will be described later. Outer diameters of the piston body 23 and the stopper member 24 are set such that outer circumferential surfaces of the piston body 23 and the stopper member 24 are level with each other, and such that the piston body 23 and the stopper member 24 can be integrally and slidingly guided in a cylinder portion 25 formed in the housing 4. The cup-shaped portion 23a of the piston body 23 has plurality of through-holes 26 formed in a front end portion thereof, the through-holes 26 being capable of communicating with the relief ports 15 of the master cylinder 2.

On the other hand, the input piston 22 is slidingly guided on a cylindrical inner surface of the stopper member 24 and a through-hole 23b formed in a bottom portion of the cup-shaped portion 23a of the piston body 23, which is a constituent component of the booster piston 21, such that a front end of the input piston 22 always projects into an interior of the cup-shaped portion 23a that constitutes a part of the pressure chamber 13. A space between the input piston 22 and the booster piston 21 is sealed by a rubber sealing member 27 that is disposed in the bottom portion of the cup-shaped portion 23a, while a space between the master cylinder 2 and the booster piston 21 is sealed by one of the sealing members 16 that is located on an outer side (on the right side as viewed in FIG. 1) of the relief port 15. This prevents brake fluid from leaking out of the master cylinder 2 via the pressure chamber 13. For the sealing member 27 for sealing the space between the input piston 22 and the booster piston 21, a material having excellent sliding properties, such as polytetrafluoroethylene, can be used instead of rubber.

The input piston 22 has a pin 28 press-fitted into a rear end portion thereof, such that the input piston 22 and the pin 28 are disposed to be perpendicular to each other. Each end of the pin 28 extends beyond a respective opening of an axial long hole 29 provided through the stopper member 24, which member is a constituent component of the booster piston 21. Further, one end of the pin 28 extends into a slit 30 formed in an axial direction in a cylinder portion 25 of the housing 4, while the other end of the pin 28 extends to a position where the other end of the pin 28 is obstructed by a stepped surface 31 on the interior of the housing 4. The pin 28 functions as a rotation stopper for controlling: a relative rotation between the input piston 22 and the booster piston 21; and a rotation of the piston assembly 20 in the housing 4. Further, the booster piston 21 and the input piston 22 are able to move relative to each other within a range in which the pin 28 is capable of moving in the long hole 29. Therefore, the pin 28 also functions as a stopper for defining a range of relative movement between the input piston 22 and the booster piston 21. Further, the pin 28 also functions as a stopper for defining a rear end to which the input piston 22 is capable of retreating, as the input piston 22 can retreat to a rear end where the pin 28 abuts against the stepped surface 31 of the housing 4.

In this way, the input piston 22 and the booster piston 21 define an annular space 32 in which a pair of springs (urging means) 34 (34A, 34B) are disposed, such that springs 34 have: one ends attached to a spring-receiving portion 33 provided on the input piston 22; and the other ends attached to the piston body 23 and the stopper member 24, respectively, which are constituent components of the booster piston 21. The springs 34 are compression coil springs having a set load and serve to maintain the input piston 22 and the booster piston 21 at a neutral position of relative movement, when brakes are not operated. As shown in FIG. 1, in this neutral position, the pin 28 that is fixed to the input piston 22 is positioned at an intermediate position in the long hole 29 of the booster piston 21. Further, when the brakes are not operated, the input piston 22 is positioned at the rear end where it brings the pin 28 into contact with the stepped surface 31 of the housing 4. In this state, the booster piston 21 is positioned, such that the through-holes 26, which are formed in the cup-shaped portion 23a of the booster piston 21, communicates with the relief port 15 of the master cylinder 2.

The electric motor 41, which is a constituent component of the electric actuator 40, is fitted into the covering plate 6 of the housing 4 provided on a lower side of the master cylinder 2, such that an output shaft 41a of the electric motor 41 extends in parallel with the piston assembly 20. The output shaft 41a of the electric motor 41 has a threaded portion 43 formed thereon. The threaded portion 43 is screwed into a threaded hole 44 formed in one end of the lever 42 that has the other end connected to the booster piston 21. This threading engagement between the threaded portion 43 and the threaded hole 44 enables rotation of the electric motor 41 to be translated into a linear motion of the lever 42. In this way, the lever 42 moves in a translational motion (liner motion) inside the housing 4. The linear motion of the lever 42 causes the booster piston 21 to move relative to the input piston 22. Therefore, a thrust (a booster thrust) is applied to the booster piston 21 according to an output of the electric motor 41. It should be noted that a small space is provided in a connecting portion between the booster piston 21 and the lever 42 so as to prevent moment due to the booster thrust.

A potentiometer 45 (displacement detection means) is provided at an intermediate portion of the lever 42. The potentiometer 45 comprises: a body portion 46 having a built-in resistive element; and a shaft 47 extending from the body portion 46 toward the vehicle compartment in parallel with the piston assembly 20, the shaft 47 having a tip that abuts against the pin 28 fixed to the input piston 22. The potentiometer 45 serves to detect an amount of relative displacement between the input piston 22 and the booster piston 21. Detection signals from the potentiometer 45 are transmitted to a controller 48 (see FIG. 2) for controlling the electric motor 41.

Next, operation of the electrically actuated brake booster 1 with the above-mentioned structure will be described.

In the electrically actuated brake booster 1, a hydraulic brake pressure is not generated in the master cylinder 2 until the booster piston 21 advances to a point where the through-holes 26, which are formed in the front end portion of the booster piston 21, has passed the inner seal member 16 of the master cylinder 2, that is, until the relief port 15 is closed. Therefore, this stage of operation constitutes a non-effective stroke. In this embodiment, this non-effective stroke can be eliminated by operating the electric motor in response to some form of external signal (for example, a touch signal from the brake pedal 8 or a signal for notifying a narrowing of a distance between vehicles, from a sensor for sensing a distance between vehicles) to thereby pre-advance the booster piston 21 to a point where the through-holes 26 of the booster piston 21 have passed the inner sealing member 16. In the meantime, the input piston 22 is also moved forward by the springs 34; thus, the booster piston 21 and the input piston 22 are maintained at the neutral position (reference position) of relative movement.

After the relief port 15 is closed, the input piston 22 moves forward according to stepping on the brake pedal 8, whereby a hydraulic brake pressure is generated in the master cylinder 2 according to a degree of thrust (input thrust) applied via the input rod 9 to the input piston 22. In this way, a relative displacement is made between the input piston 22 and the booster piston 21. Based on a detection signal from the potentiometer 45 that has detected the relative displacement, the electric actuator 40 begins its operation to move the booster piston 21 forward, whereby a hydraulic brake pressure is generated in the master cylinder 2 according to a degree of booster thrust which the electric actuator 40 applies to the booster piston 21. In other words, a pedal-stepping force is boosted to generate an increased thrust which, in turn, acts on the piston assembly 20. Therefore, a large hydraulic brake pressure is generated in the master cylinder 2.

Figure 3:
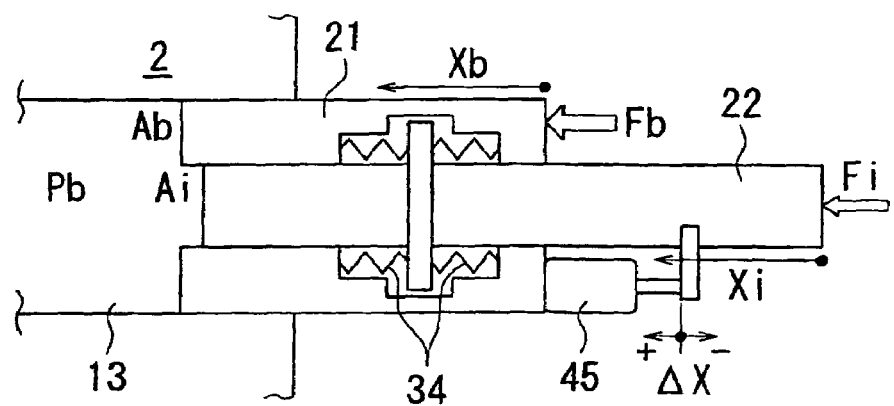
FIG. 3 is a view to be referred to in describing a pressure equilibrium in the electrically actuated brake booster of the first embodiment.

In the first embodiment, the above-mentioned input thrust is calculated based on an equation (2) below, which is derived by modifying a pressure equilibrium equation (1) below. Based on this calculated input thrust, rotation of the electric motor 41 of the electric actuator 40 is controlled. As also shown in FIG. 3, parameters Pb, Fi, Fb, Ai, Ab, K, and ΔX used in the pressure equilibrium equation (1) denote a hydraulic brake pressure in the pressure chamber (primary chamber) 13 of the master cylinder 2, an input thrust, a booster thrust, a pressure-receiving area of the input piston 22, a pressure-receiving area of the booster piston 21, a spring constant of the springs 34 (34A, 34B), and an amount of relative displacement between the input piston 22 and the booster piston 21, respectively. The amount of relative displacement ΔX is defined as ΔX=Xi−Xb, where Xi denotes a displacement of the input piston 22, and Xb denotes a displacement of the booster piston 21. Therefore, the value of ΔX is 0 at the neutral position of relative movement, has a positive sign in a direction in which the input piston 22 advances relative to the booster piston 21, and has a negative sign in the opposite direction. It should be noted here that a sliding resistance of the seal is ignored in the pressure equilibrium equation (1). In this pressure equilibrium equation (1), the booster thrust Fb can be estimated from a value of a current passing through the electric motor 41. Therefore, setting the amount of relative displacement ΔX at an appropriate value in the equation (2) below, the input thrust Fi can be calculated.

$$Pb=(Fi-K\times\Delta X)/Ai=(Fb+K\times\Delta X)/Ab \tag{1}$$

$$Fi=(Fb+K\times\Delta X)\times Ai/Ab+K\times\Delta X \tag{2}$$

On the other hand, a boost ratio α is defined in an equation (3) below. Therefore, substituting Pb of the pressure equilibrium equation (1) into the equation (3), the boost ratio α can be represented as an equation (4) below. In this case, when rotation of the electric motor 41 is controlled (feedback controlled) based on a result of detection by the potentiometer 45, such that the amount of relative displacement ΔX becomes 0, the boost ratio α becomes Ab/Ai+1. As a result, the booster ratio α can be uniquely defined by an area ratio of the pressure-receiving area Ab of the booster piston 21 to the pressure-receiving area Ai of the input piston 22, as with a vacuum brake booster. On the other hand, the boost ratio α is multiplied by a factor of (1−K×ΔX/Fi), if the spring constant K of the springs 34 is set at a slightly larger value, and the amount of relative displacement ΔX is set at a certain negative value, so as to control the rotation of the electric motor 41 such that the amount of relative displacement ΔX reaches the above-mentioned certain negative value. In this way, the electric actuator 40 can function as a boost source. As a result, the pedal-stepping force can be reduced significantly. In this case, from the definition ΔX=Xi−Xb, the displacement Xi of the input piston 22 can be reduced approximately by |ΔX|. Therefore, a pedal stroke can be reduced by a corresponding amount. In contrast, if an attempt were made to generate a boost source by displacing the booster piston 21 relative to the input piston 22, a reaction force of the hydraulic brake pressure, transmitted from the pressure chamber 13 of the master cylinder 2 to the input piston 22, would increase and act as an obstacle to reduction in pedal-stepping force. However, in this embodiment, an urging force of the springs 34 increases according to the amount of relative displacement of the booster piston 21. Therefore, the above-mentioned reaction force is offset by this urging force. In this way, the boost ratio for the pedal-stepping force (input) can be sufficiently increased.

$$\alpha=Pb\times(Ab+Ai)/Fi \tag{3}$$

$$\alpha=(1-K\times\Delta X/Fi)\times(Ab/Ai+1) \tag{4}$$

As described above, in the electrically actuated brake booster 1, a desired boost ratio can be obtained by controlling the electric actuator 40 such that the amount of relative displacement between the booster piston 21 and the input piston 22 becomes a predetermined value, based on an input thrust derived by a calculation using the pressure equilibrium equation. This eliminates the need for a costly pedal force sensor, which is required in the prior art. Therefore, costs can be reduced accordingly. Further, by setting the amount of relative displacement at an appropriate negative value, it is possible to obtain a boost ratio larger than one determined by the area ratio between the pressure-receiving areas of the booster piston 21 and the input piston 22. This enables a significant reduction in pedal force. On the other hand, it is also possible to obtain a boost ratio smaller than the one determined by the area ratio between the pressure-receiving areas of the booster piston 21 and the input piston 22, by setting the amount of relative displacement at an appropriate positive value. Therefore, a desired braking force can be obtained by setting the amount of relative displacement at an appropriate positive or negative value so as to decrease or increase the boost ratio.

In the above embodiment, the springs 34 (urging means) are provided between the input piston 22 (shaft member) and the booster piston 21 (tubular member). Therefore, a longitudinal dimension can be reduced. Further, with use of an inexpensive potentiometer 45 as a means of detecting a displacement, costs can be reduced compared to it would be with a costly step force sensor. Further, the master cylinder 2 and the electric actuator 53 are provided in the same housing 4 (support member). Therefore, a reaction force generated in the master cylinder 2 can be transmitted through the electric actuator 40 back to the housing 4; thus, a stable device operation can be achieved. The pair of springs 34, that is, the springs 34A and 34B are not necessarily required to have an equal spring constant. It is possible to provide an arrangement in which the rear spring 34B (first spring) has a spring constant larger than that of the front spring 34A (second spring). In this case, with use of the pair of springs 34A and 34B of an equal free length, a neutral position of the input piston 22 relative to the booster piston 21 is located forward of that shown in FIG. 1. In this manner, a larger range of relative movement between the input piston 22 and the booster piston 21 can be made available to a rear space than to a front space. Therefore, it is possible to operate with a larger range of brake assist, to thereby enable a boost ratio to be increased by means of the electric actuator 40. Further, even with use of the pair of springs 34A and 34B of an equal spring constant, a larger range of relative movement between the input piston 22 and the booster piston 21 can be made available to the rear space than to the front space by making the free lengths of the pair of sprigs 34A and 34B different from each other. On the other hand, to provide a setup that is better suited to regenerative cooperative control, the booster ratio of the electric actuator 40 can be reduced by making a larger range of relative movement between the input piston 22 and the booster piston 21 available to the front space than to the rear space. It should be noted here that, for the springs 34A and 34B, tension springs can be used in place of compression springs. Further, for the springs 34A and 34B, a plurality of disc springs or the like can be used in place of coil springs.

In the above embodiment, an external signal is used to operate the electric motor 41 to thereby advance the booster piston 21 beforehand to a position where a non-effective stroke is eliminated. However, such a control of eliminating the non-effective stroke is not necessarily required.

In a case in which this control is not performed, the input piston 22 is not operated at the beginning of a braking operation, and after the amount of relative displacement exceeds a predetermined value, the electric actuator 40 is operated to move the booster piston 21 forward to a position where a hydraulic brake pressure is generated. In this way, a jump-in characteristic can be obtained. Therefore, dragging of disc brakes or the like does not occur even when a brake pedal is subject to a slight stepping force. As a result, a desirable pedal feeling can be obtained.

As for an automatic braking function, it is possible to control such a function to be within a range of hydraulic pressure from a point where $Pb=-K \times \Delta X/Ai$, which is the above pressure equilibrium equation (1) with the input thrust Fi equal to 0, up to a point where $Pbmax=-K \times \Delta Xmin/A$, where $\Delta Xmin$ is a minimum value of $\Delta X$ (a maximum value in an absolute value of $\Delta X$, with a negative sign). Further, even after $\Delta X$ has reached $\Delta Xmin$, it is possible to increase a pressure by advancing the booster piston 21 with the input piston 22. Therefore, the automatic braking function can also serve as a precharge, a hill hold, a cruise control, a hydraulically assisted electric parking brake, and so on to obtain vehicle stability control.

Figure 4:
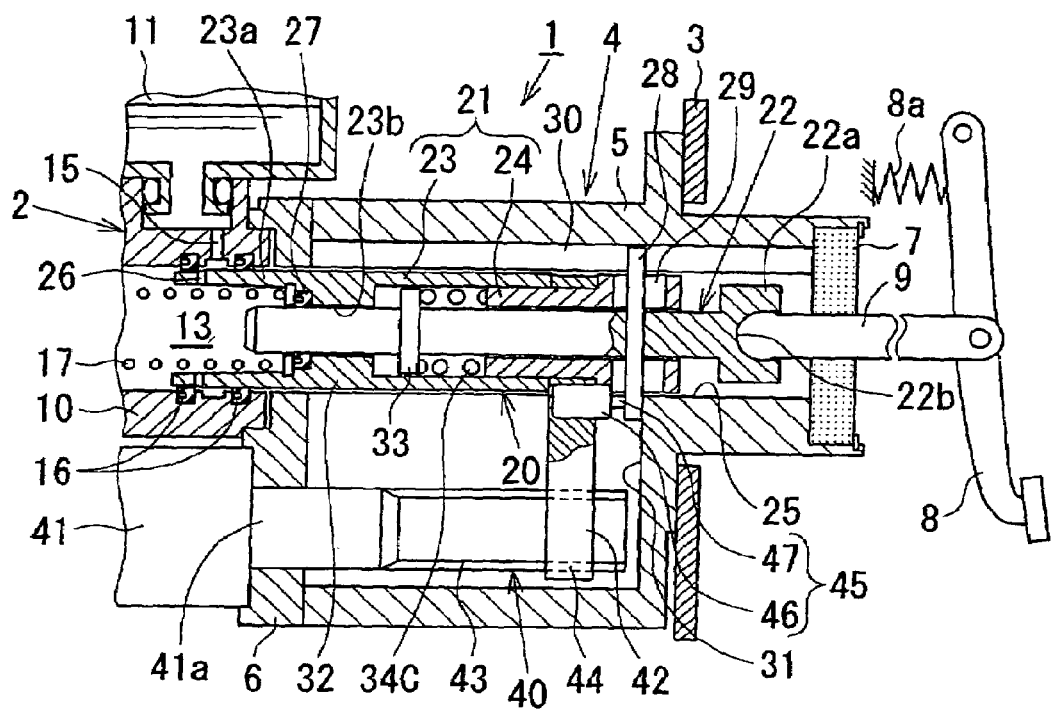
FIG. 4 is a cross-sectional view of a first modified example of the electrically actuated brake booster of the first embodiment.

FIG. 4 shows a first modified example of the above first embodiment. It should be noted that FIG. 4 shows only essential components denoted by reference numerals corresponding to those of like components of embodiment 1, since the general structure of a motor-powered brake booster 1 of this example is the same as that of the first embodiment. This first modified example is characterized in that, instead of the springs 34, only a spring 34C (a compression spring) is disposed between the input piston 22 and the booster piston 21 so as to urge the input piston 22 toward the master cylinder 2. In a state shown in FIG. 4, the spring 34C has a free length. This positional relationship between the input piston 22 and the booster piston 21 represents a neutral position (reference position). Therefore, during a braking operation, when the booster piston 21 is displaced from the neutral position of the input piston 22 and the booster piston 21 to the left (forward) relative to the input piston 22, the spring 34C urges the input piston 22 in a direction of displacement of the booster piston 21. In this case, the urging force towards the direction of displacement increases in accordance with the amount of relative displacement. Therefore, this operation is effective at a time of controlling to increase a pressure (a brake assist or the like for increasing a boost ratio). Since the spring 34C has a free length, a weak spring, which has been in place, can still be used as a spring 8a (a compression spring) for pushing back the brake pedal 8. It should be noted that, instead of the compression spring 34C, a tension spring can be disposed in a left space shown in FIG. 4.

Figure 5:
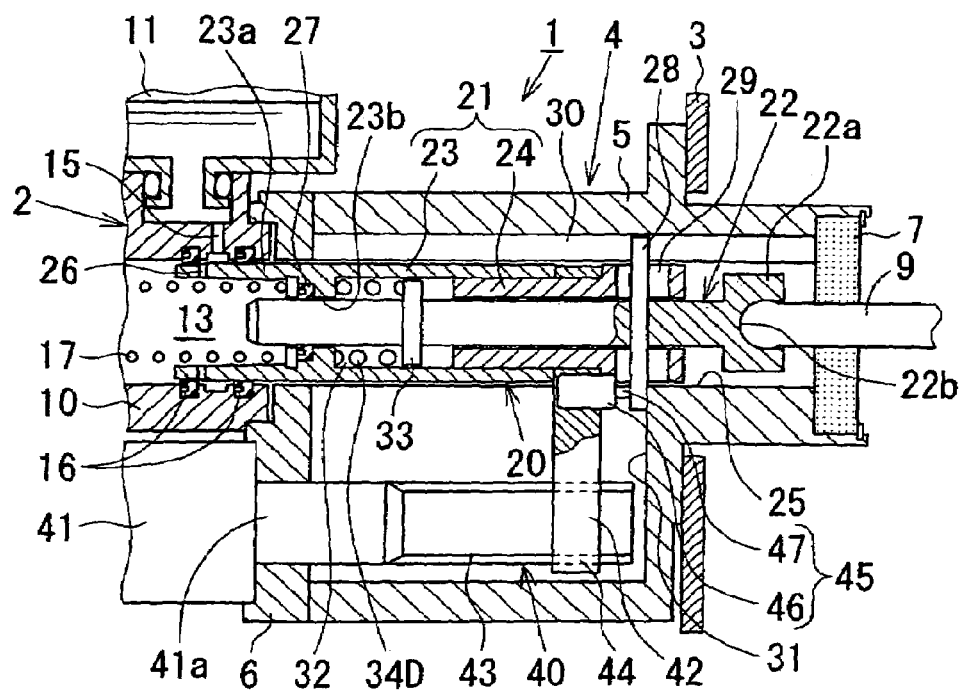
FIG. 5 is a cross-sectional view of a second modified example of the electrically actuated brake booster of the first embodiment.

FIG. 5 shows a second modified example of the above first embodiment. It should be noted that FIG. 5 shows only essential components denoted by reference numerals corresponding to those of like components of the first embodiment, since the general structure of a motor-powered brake booster 1 of this example is the same as that of the first embodiment. The second modified example is characterized in that, instead of the springs 34, only a spring 34D (a compression spring) is disposed between the input piston 22 and the booster piston 21 so as to urge the input piston 22 in a direction retreating from the master cylinder 2. The spring 34D has a certain set load in a state shown in FIG. 5, in which state the positional relationship between the input piston 22 and the booster piston 21 represents a neutral position (a reference position). Therefore, during a braking operation, when the booster piston 21 is displaced from the neutral position of the input piston 22 and the booster piston 21 to the right (backward) relative to the input piston 22, the spring 34D urges the input piston 22 more strongly in the direction of displacement of the booster piston 21. On the other hand, when the booster piston 21 is displaced in a forward direction from the neutral position relative to the input piston 22, a forward urging force against the input piston 22 is reduced as compared to a state prior to the relative displacement between the two members. Therefore, use of the spring 34D described above is effective at a time of effecting control to reduce a pressure (regenerative cooperative control or the like for reducing a boost ratio). It should be noted that, instead of the compression spring 34D, a tension spring can be provided in a right space shown in FIG. 5.

Figure 6:
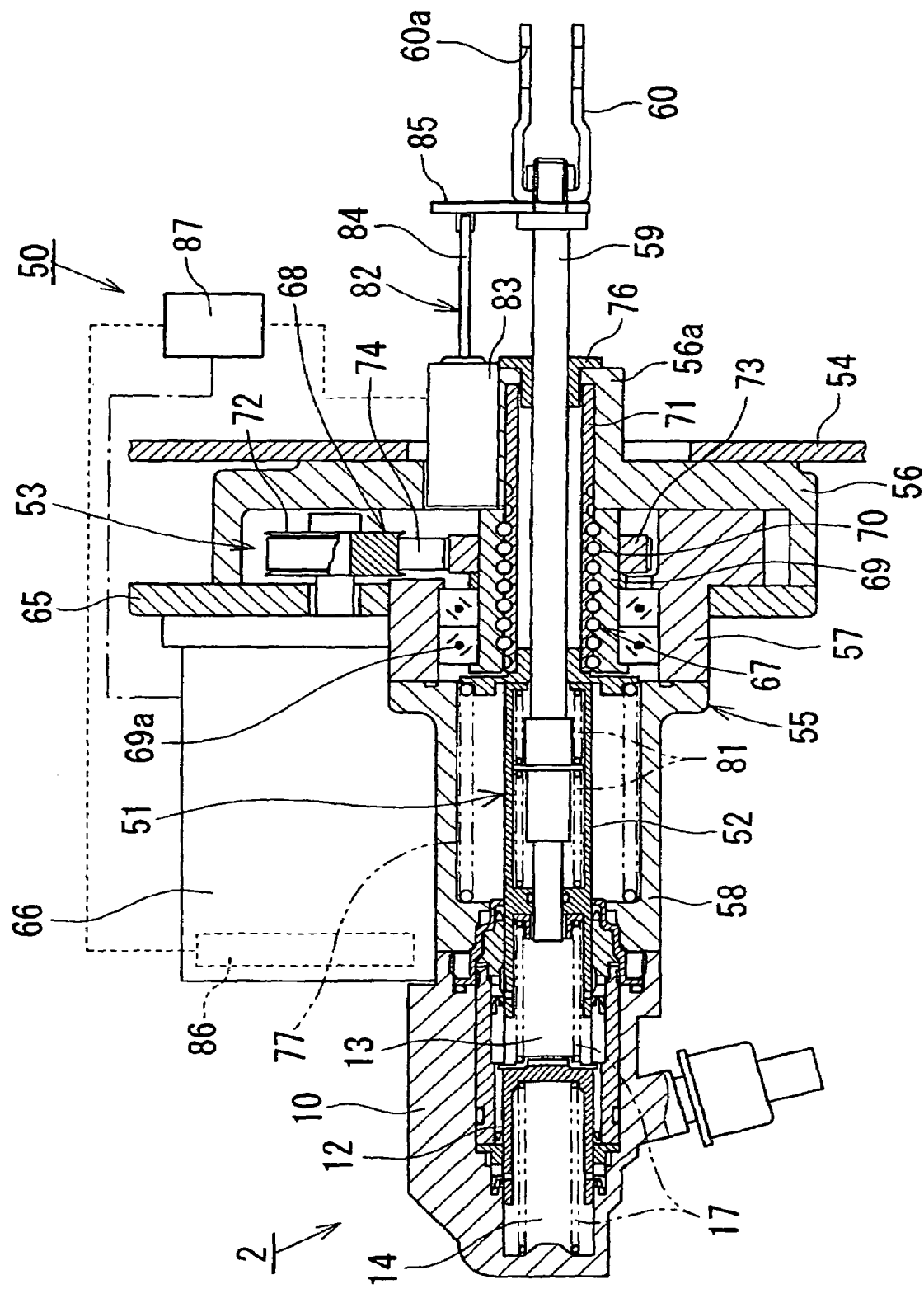
FIG. 6 is a cross-sectional view of an entire structure of an electrically actuated brake booster according to a second embodiment of the present invention.
Figure 7:
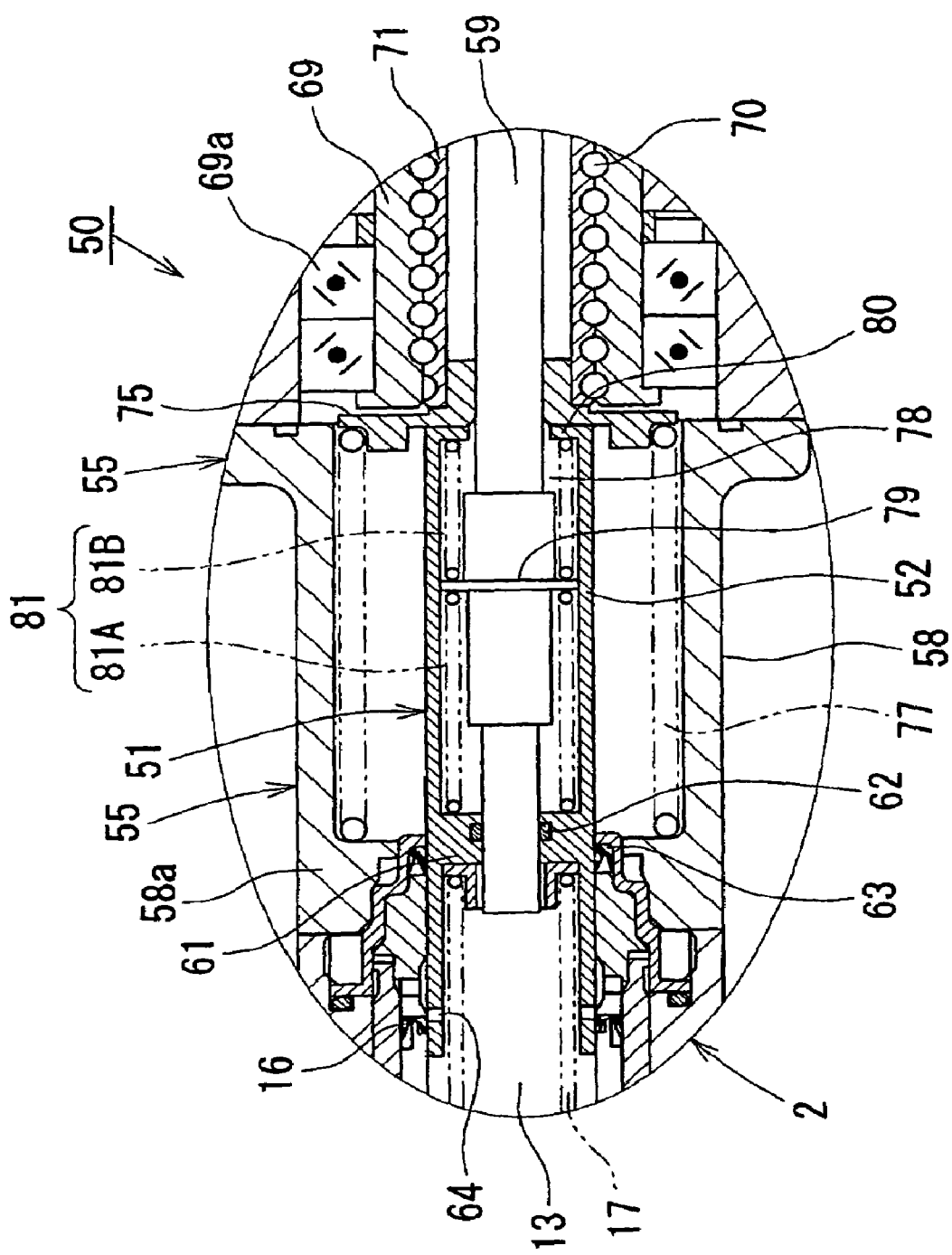
FIG. 7 is a cross-sectional view of an essential feature of the electrically actuated brake booster of the second embodiment.

FIGS. 6 and 7 show an electrically actuated brake booster according to the second embodiment of the present invention. It should be noted that the constituent elements of the tandem master cylinder 2 of this embodiment are denoted by the same reference numerals as those of the first embodiment, since no substantial difference exists in the master cylinder 2. Further, FIG. 6 does not show the reservoir of the master cylinder 2, since it is situated above the plane of FIG. 6. The electrically actuated brake booster 50 of the second embodiment comprises: a piston assembly 51 (described later) used as a primary piston of the tandem master cylinder 2; and an electric actuator 53 (also described later) for applying a thrust (a booster thrust) to a booster piston 52 (a tubular member or a second member), which is a constituent component of the piston assembly 51. The piston assembly 51 and the electric actuator 53 are disposed inside and outside a housing 55 (an assembled housing) that is secured to a wall 54 of a vehicle compartment. The housing 55 comprises: a first tubular member 57 secured via a cup-shaped attachment member 56 to a front surface of the wall 54; and a second tubular member 58 coaxially connected to the first tubular member 57, a front end of the second tubular member 58 being connected to the tandem master cylinder 2. The attachment member 56 has an inner diameter boss 56a, which extends through an opening of the wall 54 a short distance into the vehicle compartment.

The piston assembly 51, which is a constituent component of the electrically actuated brake booster 50, has a structure in which an input piston 59 (a shaft member or a first member) is disposed in an interior of the booster piston 52, such that the input piston 59 is capable of moving relative to the booster piston 52. The input piston 59 has a bracket 60 attached to a rear end thereof, the bracket 60 being connected to a brake pedal (not shown), such that the input piston 59 is movable forward and backward in accordance with operation of the brake pedal (pedal operation). The bracket 60 has an elongate attachment opening 60a extending in a direction perpendicular to the plane of FIG. 6, for absorbing relative displacement in the perpendicular direction between the brake pedal and the bracket 60, resulting from pedal operation. In place of the elongate attachment opening, there may be provided: an enlarged diameter portion 22a having a spherical recess portion 22b, the enlarged diameter portion 22a being formed at a position such that it does not interfere with a forward/backward movement of the input piston 59; and a spherical tip that is pivotally fitted into the spherical recess portion 22b, so as to allow pivotal movement of the bracket 60, as described in the first embodiment.

As most clearly shown in FIG. 7, the booster piston 52, which is a constituent component of the piston assembly 51, has a separation wall 61 at a longitudinally intermediate portion of the interior of the booster piston 52, the input piston 59 extending through the separation wall 61. A front portion of the booster piston 52 is inserted into the pressure chamber 13 (primary chamber) of the master cylinder 2, while a front portion of the input piston 59 is disposed inside the portion of the booster piston 52 that is inserted into the pressure chamber 13. A space between the booster piston 52 and the input piston 59 is sealed by a sealing member 62, which is disposed in an inner circumferential portion of the separation wall 61 of the booster piston 52, while a space between the booster piston 52 and the master cylinder 2 is sealed by a sealing member 63. This prevents brake fluid from leaking out of the master cylinder 2 through the pressure chamber 13. The booster piston 52 has a through-hole 64 formed in a front portion thereof, the through-hole 64 being capable of communicating with a relief port (not shown) of the master cylinder 2.

The electric actuator 53, which is disposed at a lateral portion of the housing 55, mainly comprises; an electric motor 66 secured to a covering plate 65 that covers an opening of the cup-shaped attachment member 56; a ball-screw mechanism 67 (rotational-linear motion converting mechanism) that is disposed in the first tubular member 57, the ball-screw mechanism 67 surrounding the input piston 59; and a rotation-transmitting mechanism 68 for transmitting rotation of the electric motor 66 to the ball-screw mechanism 67 at a reduced rotational speed. The ball-screw mechanism 67 comprises: a nut member 69 (a rotatable member) rotatably supported via a bearing 69a (angular contact bearing) by the first tubular member 57; and a hollow screw shaft 71 (linearly movable member) meshed via balls 70 with the nut member 69. A rear portion of the screw shaft 71 is slidably but non-rotatably supported by an inner circumference of the attachment member 56, whereby the screw shaft 71 can linearly move in accordance with rotation of the nut member 69. On the other hand, the rotation-transmitting mechanism 68 comprises: a first pulley 72 connected to an output shaft of the electric motor 66; a second pulley 73 non-rotatably fitted around the nut member 69; and a belt 74 (timing belt) wound around the pulleys 72 and 73. The second pulley 73 has a diameter larger than that of the first pulley 72, such that rotation of the electric motor 66 is reduced in speed and transmitted to the nut member 69 of the ball-screw mechanism 67. It should be noted that the rotation-transmitting mechanism 68 is not limited to the above-mentioned pulleys and belt, and can be replaced with a speed-reducing gear mechanism.

A flange member 75 is fixedly fitted into a front portion of the hollow screw shaft 71, which is a constituent component of the ball-screw mechanism 67. Further, a tubular guide 76 is fixedly fitted into the inner diameter boss 56a of the attachment member 56. Inner diameters of the flange member 75 and the tubular guide 76 are set such that the flange member 75 and the tubular guide 76 function as guides for slidingly guiding the input piston 59. The flange member 75 abuts against a rear end of the booster piston 52 as the screw shaft 71 moves forward, that is, to the left in FIG. 6, whereby the booster piston 52 also moves forward. The second tubular member 58, which is a constituent component of the housing 55, has a return spring 77 therein, one end of the return spring 77 being attached to an annular projection 58a formed on an inner surface of the second tubular member 58, the other end of the return spring 77 abutting against the flange member 75. By means of the return spring 77, the screw shaft 71 is positioned as viewed in FIG. 6, when brakes are not in operation.

The input piston 59 and the booster piston 52 define an annular space 78 in which a pair of springs 81 (81A, 81B) (urging means) are disposed, such that one end of each of the springs 81A and 81B is attached to the flange portion 79 provided on the input piston 59; and the other ends of the springs are attached to the separation wall 61 of the booster piston 52 and to an inner flange 80 formed in a rear portion of the booster piston 52, respectively. The springs 81 serve to maintain the input piston 59 and the booster piston 52 at a neutral position of relative movement, when the brakes are not in operation.

In the second embodiment, a potentiometer 82 (first absolute-displacement detecting means) for detecting an absolute displacement of the input piston 59 relative to a vehicle body is disposed in the attachment member 56, which is secured to the wall 54 of the vehicle compartment. The potentiometer 82 comprises: a body portion 83 containing a resistive element; and a sensor rod 84 extending in parallel with the input piston 59 from the body portion 83 into the vehicle compartment. The sensor rod 84 is constantly urged in its projecting direction by a spring provided in the body portion 83, such that a tip of the sensor rod 84 abuts against a bracket 85 fixed to the rear portion of the input piston 59. On the other hand, the electric motor 66, which is a DC brushless motor, contains a resolver 86 for detecting a magnetic pole position in order to control rotation of the electric motor 66. Besides detecting a rotational displacement of the motor, the resolver 86 functions as rotation detecting means (second absolute-displacement detecting means) for detecting an absolute displacement of the booster piston 52 relative to the vehicle body based on the detected rotational displacement of the motor. The potentiometer 82 and the resolver 86 constitute displacement-detecting means for detecting an amount of relative displacement between the input piston 59 and the booster piston 52. Detection signals from the potentiometer 82 and the resolver 86 are transmitted to a controller 87. The rotation detecting means is not limited to the resolver, and a rotary potentiometer or the like capable of detecting an absolute displacement (angle) can be used instead.

Next, operation of the electrically actuated brake booster 50 of the second embodiment will be described.

When the brake pedal is operated, the input piston 59 is moved forward. The movement of the input piston 59 is detected by the potentiometer 82. In response to a signal from the potentiometer 82, the controller 87 outputs a command to the electric motor 66 to start generating a rotating motion. This rotating motion is transmitted via the rotation-transmitting mechanism 68 to the ball-screw mechanism 67, thereby moving the screw shaft 71 forward together with the booster piston 52. In other words, the input piston 59 and the booster piston 52 move forward together. Therefore, a hydraulic brake pressure, which corresponds to an input thrust applied to the input piston 59 by the brake pedal and a booster thrust applied to the booster piston 52 by the electric actuator 53, is generated in the pressure chambers 13 and 14 of the tandem master cylinder 2.

At this stage, based on the detection signals from the potentiometer 82 and the resolver 86, an amount of relative displacement between the input piston 59 and the booster piston 52 is determined from a difference between absolute displacements of the input piston 59 and the booster piston 52. Then the electric motor 66 is controlled to eliminate the relative displacement between the input piston 59 and the booster piston 52, such that the pair of springs 81 (81A, 81B), which are disposed between the pistons 59 and 52, maintain the pistons 59 and 52 at the neutral position. At this time, since the amount of relative displacement $\Delta X$ is 0, the boost ratio, as shown in the above equation (4), is uniquely defined by an area ratio between the pressure-receiving areas of the booster piston 52 and the input piston 59, as is the case with commonly used vacuum brake boosters. On the other hand, when the booster piston 52 is relatively displaced by the booster thrust from the neutral position in a (forward) direction in which the hydraulic brake pressure increases ($\Delta X$ is a certain negative value), the boost ratio increases in accordance with the equation (4), as described in the first embodiment. In this manner, the electric actuator 53 functions as a boost source and significantly reduces the pedal-stepping force. In this case, the urging forces of the springs 81 increase in accordance with the relative displacement of the booster piston 52 and offset a reaction force acting on the input piston 59 caused by hydraulic brake pressure, as described in the first embodiment. In this way, the boost ratio for the pedal-stepping force (input) can be increased sufficiently. In contrast, when the booster piston 52 is relatively displaced by the booster thrust from the neutral position in a (backward) direction in which the hydraulic brake pressure decreases ($\Delta X$ is a certain positive value), the urging force of the front spring 81A (second spring), that is, one of the springs 81 located in front of the other, increases in accordance with the relative displacement of the booster piston 52, as described in the first embodiment. This urging force adds to the reaction force transmitted to the input piston 59. Therefore, the boost ratio for the pedal-stepping force (input) can be reduced in accordance with the equation (4).

Particularly, in the second embodiment, a rotational motion generated by the electric motor 66 to drive the booster piston 52 is converted by the ball-screw mechanism 67 before it is transmitted to the booster piston 52. Therefore, the driving motion is smoothly transmitted from the electric actuator 53 to the booster piston 52. As a result, the booster thrust can be stably applied. Further, use of the ball-screw mechanism 67 prevents the booster piston 52 from exerting a moment on the electric motor 66. Therefore, a load on the electric motor 66 can be reduced accordingly. Further, the electrically actuated brake booster of the second embodiment is provided with the potentiometer 82 and the resolver 86 for detecting the absolute displacements of the input piston 59 and the booster piston 52 relative to the vehicle. Therefore, detected results can be effectively utilized for brake-assist control in accordance with a stroke of the input piston and a pedal speed, regenerative cooperative control, adaptive cruise control (ACC), and so on. Further, in the second embodiment, since the potentiometer 82 and the resolver 86 are used as absolute-displacement detecting means, the body portion of the potentiometer 82 and the resolver 86 can be secured to an immovable member such as the housing 55 or the attachment member 56, respectively. This facilitates installation of electric cables for signal transmission. Further, since the body portion of the potentiometer 82, the resolver 86, and the electric cables for them are fixedly disposed, durability against vibrations or the like can be enhanced.

Figure 8:
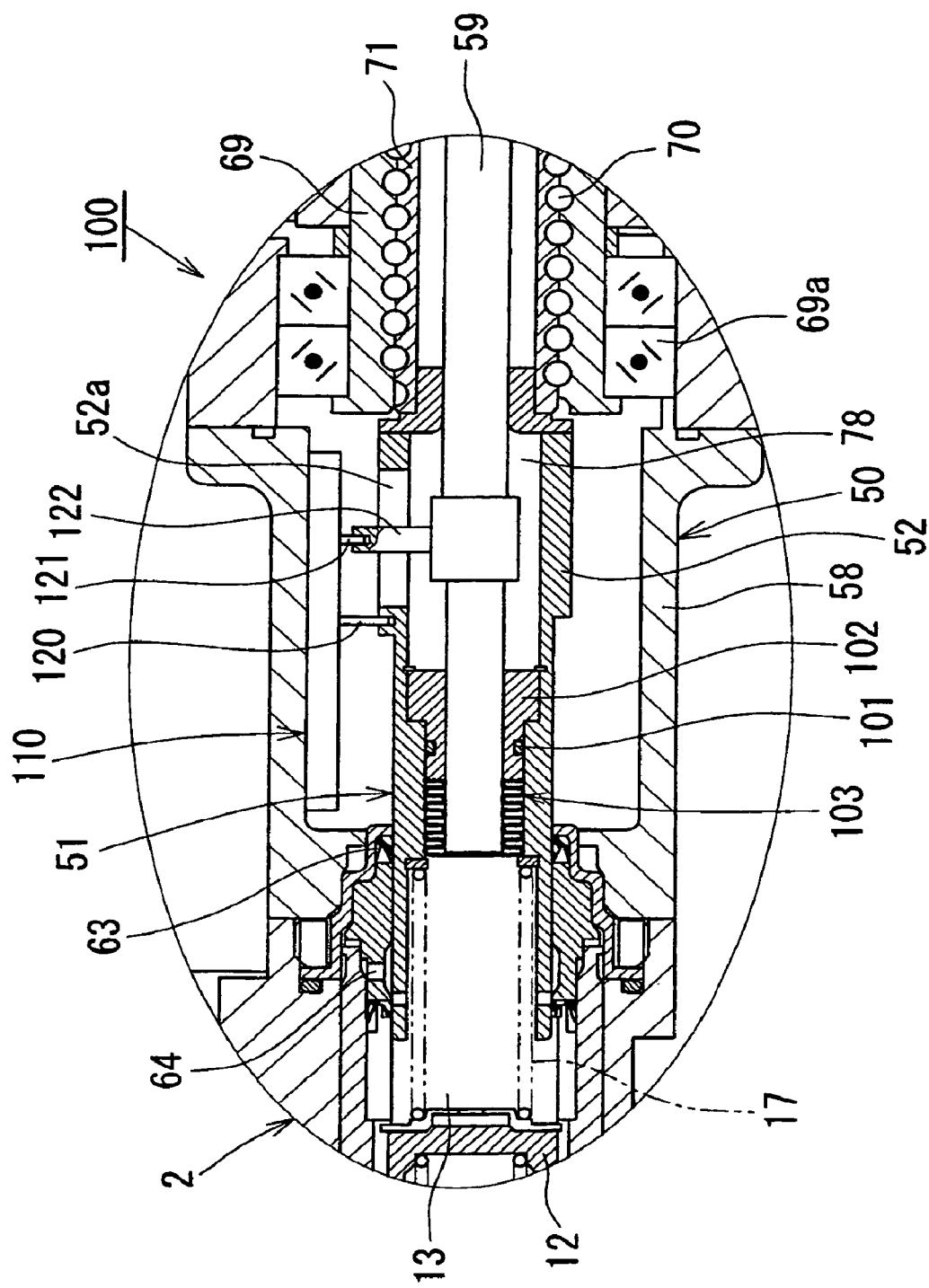
FIG. 8 is a cross-sectional view of an essential feature of an electrically actuated brake booster according to a third embodiment of the present invention.

FIG. 8 shows an electrically actuated brake booster according to the third embodiment of the present invention. Since the general structure of the electrically actuated brake booster 100 of the third embodiment is substantially the same as the electrically actuated brake booster 50 of the above second embodiment, elements in FIG. 8 that corresponds to those in FIGS. 6 and 7 are denoted by like reference numerals, and their descriptions are omitted. In the third embodiment, a metal bellows 103 is used as a spring means, instead of the springs 81 (81A, 81B) of the second embodiment. Further, a single potentiometer 110 is used instead of the potentiometer 82 and the resolver 86 (rotation detecting means) that serve as absolute-displacement detecting means in the second embodiment.

More specifically, a hollow plug 102 is fixedly fitted via a sealing member 101 into the booster piston 52 (tubular member or second member), which is a constituent component of the piston assembly 51. A tip of the input piston 59 (shaft member or first member), which is also a constituent component of the piston assembly 51, extends, slidably through the hollow plug 102, into the pressure chamber 13 of the master cylinder 2. The metal bellows 103 has a tubular shape with a closed end. An open end of the metal bellows 103 is fixed to an end surface of the hollow plug 102, while a tip of the input piston 59, which extends through the hollow plug 102, is attached to an inner surface of the closed end of the metal bellows 103. The metal bellows 103 has a certain set load in the state shown in FIG. 8. In this state, the positional relationship between the input piston 59 and the booster piston 52 represents a neutral position (reference position) of relative movement. Therefore, when the booster piston 52 is displaced, relative to the input piston 59, from the neutral position of the input piston 59 and the booster piston 52 to the left (forward) during an operation, the metal bellows 103 increases its urging force on the input piston 59 in a (forward) direction in which the booster piston 52 is displaced. On the other hand, when the booster piston 52 is displaced to the right (backward) relative to the input piston 59, the metal bellows 103 increases its urging force on the input piston 59 in a (backward) direction in which the booster piston 52 is displaced.

Figure 9:
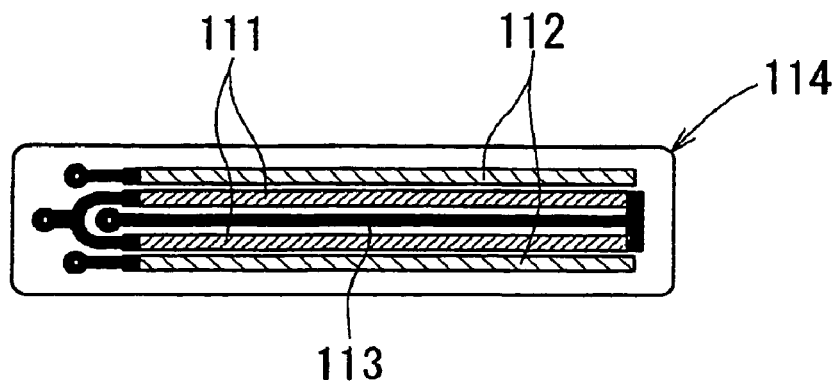
FIGS. 9 (A), (B), and (C) show a structure of a potentiometer used in the electrically actuated brake booster of the third embodiment.
Figure 9:
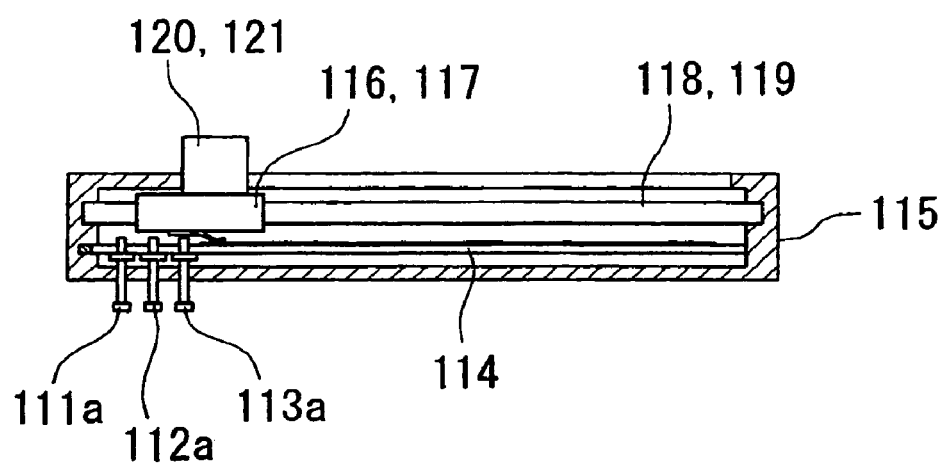
Figure 9:
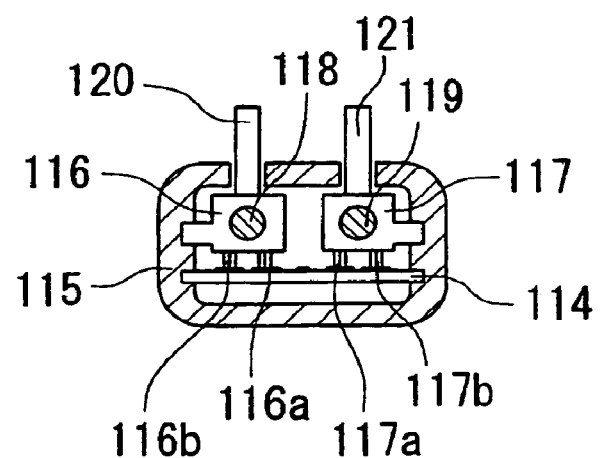

The potentiometer 110 is fixedly provided on an inner surface of the second tubular member 58, which is a constituent component of the housing 55, the potentiometer 110 extending in parallel with the piston assembly 51. As shown in FIG. 9, the potentiometer 110 comprises a casing 115 that contains a substrate 114 on which a feeder 113 made of a low-resistance conductor is disposed between pairs of a resistor 111 made of a high-resistance conductor and a current collector 112 made of a low-resistance conductor. The resistors 111, the current collectors 112, and the feeder 113 have a terminal 111a, a terminal 112a, and a terminal 113a, respectively, for connection to a controller 87. Further, in the casing 115, movable contacts 116 and 117 are provided on the corresponding pairs of the resistor 111 and the current collector 112. The movable contacts 116 and 117, respectively, have brushes 116a and 116b and brushes 117a and 117b for electrical connection between the resistors 111 and the corresponding current collectors 112. Further, the movable contacts 116 and 117 are slidably mounted on slide guides 118 and 119 in the casing 115, respectively, the slide guides 118 and 119 extending in parallel with each other across the casing 115. Further, the movable contacts 116 and 117 are integrally provided with connecting bars 120 and 121, respectively. As shown in FIG. 8, the connecting bar 120 of the movable contact 116 is connected to the booster piston 52, while the connecting bar 121 of the movable contact 117 is connected to a connecting piece 122 that extends from the input piston 59 through a long hole 52a of the booster piston 52. The potentiometer 110 first detects absolute displacements of the booster piston 52 and the input piston 59 relative to the vehicle, based on positions of the movable contacts 116 and 117, respectively, and then measures an amount of relative displacement between the booster piston 52 and the input piston 59 on the basis of a difference between the absolute displacements of the pistons.

The operation of the electrically actuated brake booster 100 of the third embodiment is substantially the same as that of the electrically actuated brake booster 50 of the second embodiment. With use of the electric actuator 53 as a boost source, the booster piston 52 is displaced, relative to the input piston 59, from the neutral position in a forward direction. This causes a forward urging force of the metal bellows 103 against the input piston 59 to increase. This urging force offsets a reaction force transmitted to the input piston 59 due to a hydraulic braking pressure. Therefore, as in the first and second embodiments, the boost ratio for the pedal-stepping force (input thrust) can be increased sufficiently. On the other hand, when the booster piston 52 is displaced, relative to the input piston 59, from the neutral position in a backward direction, a backward urging force of the metal bellows 103 acting on the input piston 59 increases. This urging force in turn causes a reaction force transmitted to the input piston 59 to increase. Therefore, as in the first and second embodiment, the boost ratio for the pedal-stepping force (input thrust) can be decreased.

Particularly, in the third embodiment, sealing between the booster piston 52 and the input piston 59 is ensured by the metal bellows 103. This eliminates the need for the sealing member 27 (see FIG. 1) required in the first embodiment, or the sealing member 62 (see FIG. 7) required in the second embodiment. As a result, relative movement (sliding movement) between the booster piston 52 and the input piston 59 becomes smoother with improved accuracy in controlling brake assist or the like. Further, the functions of the two absolute-displacement detecting means 82 and 86 (see FIG. 6) are integrated into the single potentiometer 110, which is disposed in the housing 55. Therefore, the structure of the electrically actuated brake booster of the third embodiment can be made relatively simple.

Figure 10:
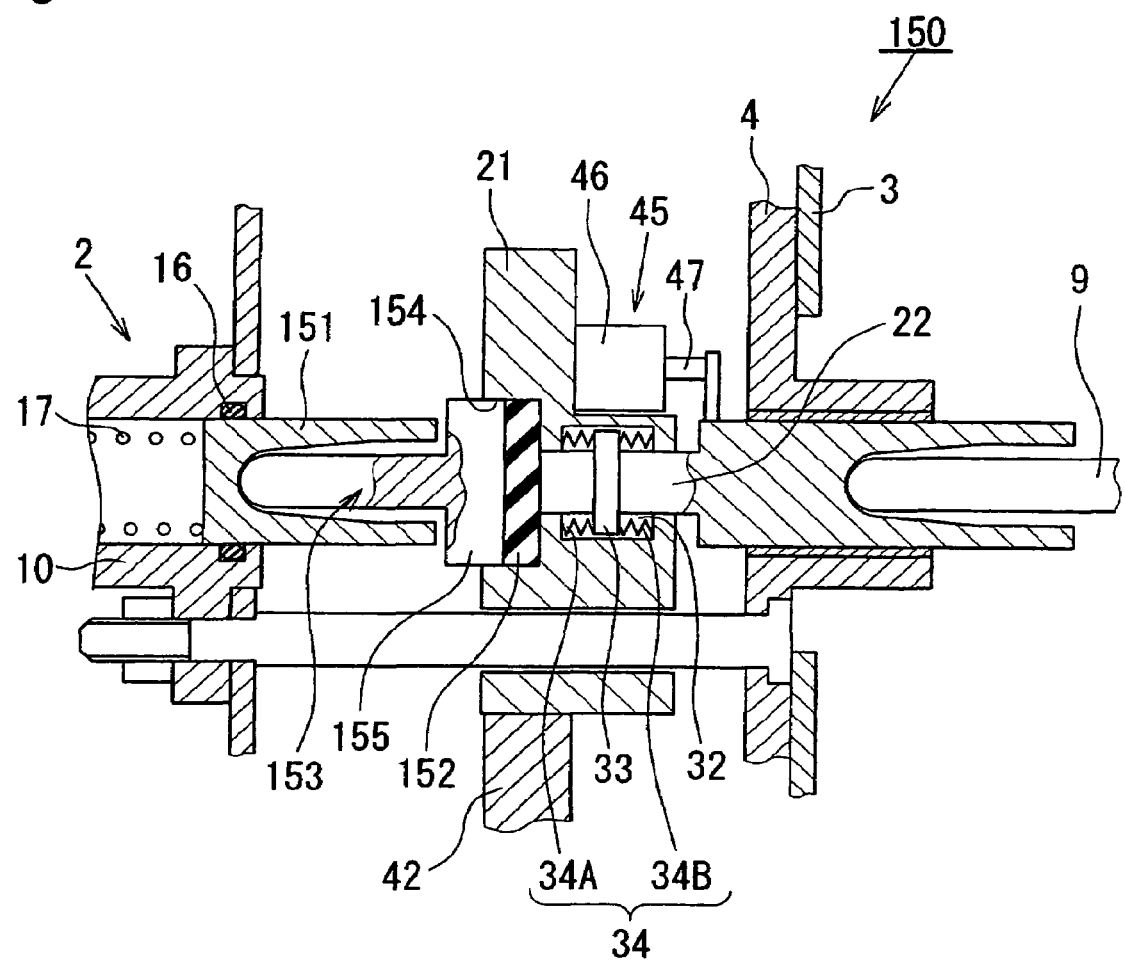
FIG. 10 is a cross-sectional view of an essential feature of an electrically actuated brake booster according to a fourth embodiment of the present invention.

FIG. 10 shows an electrically actuated brake booster according to the fourth embodiment of the present invention. Since there are commonalities between the general structures of the electrically actuated brake booster 150 of the fourth embodiment and the electrically actuated brake booster 1 of the above first embodiment, elements in FIG. 10 that correspond to those in FIGS. 1 and 2 are denoted by like reference numerals, and their descriptions are omitted. In the first embodiment, the piston assembly 20 (input piston 22 and booster piston 21) is used to define the pressure chamber 13, such that a part of a reaction force resulting from a hydraulic brake pressure generated in the master cylinder is transmitted to the input piston 22 (first member), while another part of the reaction force is transmitted to the booster piston 21 (second member). In the fourth embodiment, however, an ordinary primary piston 151 is used instead to define the pressure chamber 13, and a reaction disc 152 (a reaction member) is disposed between the primary piston 151 and the input piston 22/the booster piston 21.

In FIG. 10, the electrically actuated brake booster 150 comprises: an input rod 9 adapted to move forward and backward in accordance with operation of the brake pedal, while being slidingly guided on the housing 4; an input piston 22 adapted to move with a forward movement of the input rod 9; a booster piston 21 disposed so as to be capable of moving relative to the input piston; an output piston 153 adapted to press against the primary piston 151 of the tandem master cylinder 2; and an elastic reaction disc 152 disposed between the input piston 22/the booster piston 21 and the output piston 153. A booster thrust is applied to the booster piston 21 via a lever 42 that converts rotation of the electric motor (not shown) into a linear motion. On a surface of the booster piston 21 facing the output piston 153 (a left surface in FIG. 10) is formed an opening 154, an inner circumferential configuration of which substantially corresponds to an outer circumferential configuration of the reaction disc 152. The reaction disc 152 is contained in a portion on a bottom side of the opening 154, while an enlarged diameter portion 155, which is formed on one end of the output piston 153, is disposed on an open side of the opening 154, such that the reaction disc 152 and the enlarged diameter portion 155 are adjacent to each other. A tip of the input piston 22 is fitted into the booster piston 21 from a side opposite to the open side of the opening 154, so as to abut against a central portion of an end surface of the reaction disc 152. The input piston 22 is provided with a spring-receiving portion 33 projecting radially outward in a flange shape. The spring-receiving portion 33 is located in a hollow portion 32 formed in the booster piston 21. Further, the spring-receiving portion 33 is provided on each side with a pair of springs 34 (34A, 34B), such that the input piston 22 and the booster piston 21 are maintained in a neutral position (a reference position) shown in FIG. 10.

The reaction disc 152 is tightly closed in a space between the input piston 22, the booster piston 21, and the output piston 153. For a material of the reaction disc 152, although nitrile rubber (NBR) that is less likely to harden at a low temperature can be used, a material that has a low deformation resistance and is less likely to suffer a permanent deformation, such as silicone rubber or fluorosilicone rubber, is more suitable. Further, in place of the reaction disc 152, a liquid with a low viscous resistance or a powder can be used as a reaction member in the present embodiment. Further, the structure is not limited to the one in which the reaction disc 152 is disposed in the opening 154 of the booster piston 21, and the enlarged diameter portion 155 of the output piston 153 can be formed in a cup shape so as to contain the reaction disc 152. In this case, without the need for forming the opening 154, the booster piston 21 can be simply disposed in abutting relation to an end surface of the reaction disc 152.

The potentiometer 45 detects an amount of relative displacement between the input piston 22 and the booster piston 21 on the basis of an output voltage and outputs the detection signal indicating the detected amount to a controller (not shown). The controller uses the detection signal output from the potentiometer 45 as a variable in the pressure equilibrium equation to estimate an input thrust Fi and yields a drive signal for driving the electric motor.

In the electrically actuated brake booster 150, a thrust (the input thrust Fi) from the input rod 9 is transmitted via the reaction disc 152 to the output piston 153, when the brake pedal is depressed. At the same time, the controller starts operating the electric motor in accordance with the drive signal obtained from the input thrust Fi, which is estimated from the detection signal from the potentiometer 45, whereby the booster piston 21 moves forward to apply a booster thrust Fb to the output piston 153 via the reaction disc 152. In this way, the output piston 153 applies a resultant thrust (output thrust), which is the sum of the input thrust Fi and the booster thrust Fb, to the primary piston 151 of the tandem master cylinder 2. A reaction force due to a hydraulic brake pressure generated in this process is transmitted through the primary piston 151, the output piston 153, and the reaction disc 152 to the input piston 22 and the booster piston 21.

Then, based on a detection signal from the potentiometer 45, the amount of relative displacement from the neutral position between the input piston 22 and the booster piston 21 is appropriately controlled to move the booster piston 21 in a forward or backward direction, whereby the pair of springs 34 exert an urging force on the input piston 22. In this way, a desired boost ratio can be obtained, as described in the first embodiment.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2005-192490 filed on Jun. 30, 2005 including specification, claims, drawings and summary is incorporated herein by reference in its entirety.

What is claimed is:

1. An electrically actuated brake booster including: a first member adapted to move forward and backward in accordance with operation of a brake pedal; a second member disposed so as to be capable of moving relative to the first member; and an electric actuator for moving the second member forward and backward, wherein a hydraulic brake pressure is generated in a master cylinder by an input thrust applied to the first member by the brake pedal and a booster thrust applied to the second member by the electric actuator, such that a part of a reaction force resulting from the hydraulic brake pressure is transmitted to the first member, while another part of the reaction force is transmitted to the second member, the electrically actuated brake booster comprising:

urging means disposed between the first member and the second member, wherein, when the first member and the second member are displaced relative to each other in at least one direction, an urging force of the urging means against the first member in a direction in which the second member is displaced relative to the first member becomes larger than that in a state prior to the relative displacement between the first and the second members.

2. An electrically actuated brake booster according to claim 1, wherein the first member is a shaft member, and the second member is a tubular member that is disposed outside the shaft member so as to be capable of moving relative to the shaft member.

3. An electrically actuated brake booster according to claim 2, wherein the shaft member and the tubular member serve as pistons of a master cylinder, front tip portions of the shaft member and the tubular member are disposed to face a pressure chamber of the master cylinder, such that a part of a reaction force resulting from a hydraulic brake pressure in the pressure chamber is transmitted to the shaft member, while another part of the reaction force is transmitted to the tubular member.

4. An electrically actuated brake booster according to claim 3, wherein the urging means is disposed in an interior of the tubular member.

5. An electrically actuated brake booster according to claim 2, wherein the urging means is disposed in an interior of the tubular member.

6. An electrically actuated brake booster according to claim 2, wherein a reaction member for transmitting a reaction force from a piston of the master cylinder to the shaft member and the tubular member is disposed between the shaft member/the tubular member and the piston.

7. An electrically actuated brake booster according to claim 1, wherein the urging means urges the first member relative to the second member towards a neutral position of relative displacement.

8. An electrically actuated brake booster according to claim 7, wherein the urging means comprises: a first spring for urging the first member relative to the second member in one direction; and a second spring for urging the first member relative to the second member in another direction, such that the neutral position is located in a position where spring forces of the first spring and the second spring are balanced.

9. An electrically actuated brake booster according to claim 1, wherein a forward urging force of the urging means acting on the first member, when the second member is displaced relative to the first member in a forward direction, becomes larger than that in a state prior to the relative displacement between the first and second members, so as to increase a boost ratio.

10. An electrically actuated brake booster according to claim 1, wherein a backward urging force of the urging means acting on the first member, when the second member is displaced relative to the first member in a backward direction, becomes larger than that in a state prior to the relative displacement between the first and second members, so as to decrease a boost ratio.

11. An electrically actuated brake booster according to claim 1, further comprising displacement-detecting means for detecting an amount of relative displacement between the first member and the second member, wherein the electric actuator is controlled on the basis of a detection signal output from the displacement-detecting means so as to adjust the amount of relative displacement to a predetermined value.

12. An electrically actuated brake booster according to claim 11, wherein the displacement-detecting means is disposed between the first member and the second member so as to detect an amount of relative displacement between the first and the second members.

13. An electrically actuated brake booster according to claim 11, wherein the displacement-detecting means comprises: first absolute-displacement-detecting means for detecting an absolute displacement of the first member relative to a vehicle body; and second absolute-displacement detecting means for detecting an absolute displacement of the second member relative to the vehicle body.

14. An electrically actuated brake booster according to claim 13, wherein the electric actuator is driven by a motor, and the second absolute-displacement detecting means comprises a rotation-detecting means for detecting a rotational displacement of the motor.

15. An electrically actuated brake booster including: a shaft member adapted to move forward and backward in accordance with operation of a brake pedal; a tubular member disposed outside the shaft member so as to be capable of moving relative to the shaft member; and an electric actuator for moving the tubular member forward and backward, the shaft member and the tubular member serving as pistons of the master cylinder, front tip portions of the shaft member and the tubular member being disposed to face a pressure chamber of a master cylinder, such that a hydraulic brake pressure is generated in the master cylinder by an input thrust applied to the shaft member by the brake pedal and a booster thrust applied to the tubular member by the electric actuator, the electrically actuated brake booster comprising:

urging means for maintaining the shaft member and the tubular member in a neutral position of relative displacement, when brakes are not in operation; and displacement-detecting means for detecting an amount of relative displacement between the shaft member and the tubular member, wherein the electric actuator is controlled based on a detection signal output from the displacement-detecting means so as to adjust the amount of relative displacement to a predetermined value.

16. An electrically actuated brake booster according to claim 15, wherein the urging means comprises: a first spring for urging the shaft member relative to the tubular member in one direction; and a second spring for urging the shaft member relative to the tubular member in another direction, such that the neutral position is located in a position where spring forces of the first spring and the second spring are balanced.

17. An electrically actuated brake booster according to claim 15, wherein the displacement-detecting means is disposed between the shaft member and the tubular member so as to detect an amount of relative displacement between the shaft and tubular members.

* * * * *